Jan. 14, 1969 MASUO ICHIMORI 3,422,415
PROXIMITY DETECTING APPARATUS
Filed Dec. 20, 1965

MASUO ICHIMORI
INVENTOR
BY Orland M. Christensen
ATTORNEY

MASUO ICHIMORI
INVENTOR

BY
Orland M. Christensen
ATTORNEY

United States Patent Office 3,422,415
Patented Jan. 14, 1969

3,422,415
PROXIMITY DETECTING APPARATUS
Masuo Ichimori, 15–18 Higashitanakase, Terado, Muko-machi, Otokuni-gun, Kyoto, Japan
Filed Dec. 20, 1965, Ser. No. 514,913
U.S. Cl. 340—258 4 Claims
Int. Cl. G08b 13/22

ABSTRACT OF THE DISCLOSURE

A proximity detecting apparatus is disclosed which includes a capacitive probe connected to an improved transistor oscillator circuit of a modified Colpitts type. The improved circuit provides greater stability and accuracy of the switching frequency or capacitance change necessary to provide a proximity indication and which is characterized by being affected very little by changes in ambient temperature. It also includes an overvoltage protection feature.

This invention relates to a proximity detecting apparatus and more particularly to an apparatus for electrically detecting the approach of an object, which comprises an oscillating means the oscillating condition of which varies with the change of capacitance on a detecting element caused by the approach of an object thereto.

Many types of electrical proximity detectors are known and used for detecting, for example, the level of liquid or powder within a container or tank. In some of them, a vacuum-tube oscillator is employed so that when an object to be detected approaches a detecting electrode, the capacitance thereon changes, with a resulting change in the amplitude of the oscillation. This change is detected as a corresponding change in the plate current of the vacuum tube, and this change is utilized to operate a relay or indicator.

Many attempts to transistorize such oscillators have encountered various difficulties. In an oscillator comprising transistors, for example, of the Colpitts type, among those factors which determine the amplitude of the oscillation there are the internal electrical characteristics of the transistors employed and these characteristics are easily influenced by the ambient temperature. This means that the oscillator of the transistorized type cannot stably operate in response to a change in capacitance of the order of 1 to 2 pf. to which the vacuum-tube type can respond stably. Moreover, powders or liquids such as, for example, oil are likely to be electrostatically charged when transferred into a tank or disturbed. Experience shows that powders of insulating material such as plastics are charged to hundreds of thousands of volts. It seldom happens that vacuum tubes are destroyed by discharge of the static electricity of the detecting electrode. Such discharge, however, would instantly destroy transistors, so that it would be necessary to provide a protective circuit.

If such difficulties as aforesaid have been successfully overcome, the advantages of transistors over vacuum tubes are apparent. With transistors, for example, the whole apparatus can be made of a more compact size; the operating voltage can be easily obtained by a Zener diode, with resulting improvements in the stability of the sensitivity of the apparatus under fluctuations of the operating voltage; the apparatus gets ready for operation the instant it is switched on; and transistors have a longer life.

Accordingly, it is one objet of the invention to provide a proximity detecting apparatus which is provided with an oscillator which is stable and exact in operation.

Another object of the invention is to provide a proximity detecting apparatus which is provided with a transistorized oscillator the oscillating condition of which changes with a change in capacitance caused by the approach of an object to a detecting element.

In an oscillator comprising transistors such as the Colpitts oscillator, the oscillating frequency is scarcely influenced by changes in the ambient temperature. Accordingly, another object of the invention is to provide a proximity detecting apparatus which is provided with an oscillator the oscillating frequency of which varies with a change in capacitance caused by the approach of an object to the detecting element.

Still another object of the invention is to provide a proximity detecting apparatus which is provided with an oscillator the oscillating amplitude of which quickly and sharply changes in spite of slow approach of an object to the detecting element.

Other objects, features and advantages of the invention will become apparent from the following detailed description of a preferred embodiment of the invention with reference to the accompanying drawings, wherein.

Figure 1:
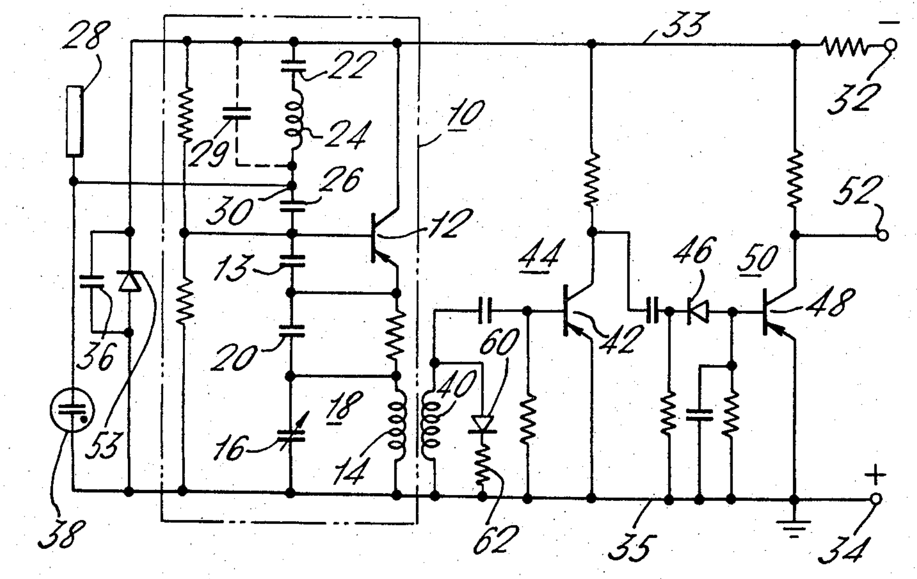
FIG. 1 is a circuit diagram of one embodiment of the invention.

Referring to the drawings, there is shown in FIG. 1 an oscillator of the Colpitts type generally designated by 10. The oscillator 10 includes a transistor 12. In order for a transistorized Colpitts oscillator to sustain its oscillation, the emitter-base reactance and the emitter-collector reactance must be capacitive and the base-collector reactance, inductive. In the illustrated arrangement, while a condenser 13 is connected between the base and emitter of the transistor 12, not only a condenser 20 but also a parallel combination 18 of a coil 14 and a condenser 16 are serially connected between the emitter and collector of the transistor 12. Between the base and collector of the transistor 12 there is connected a series combination of a condenser 22, an inductance coil 24 and a condenser 26. The condenser 22 has a comparatively large capacity and consequently presents as low a reactance as possible to the oscillating frequency of the oscillator.

An electrode 28 for detecting the approach of an object there to is connected to a junction 30 between the coil 24 and the condenser 26. The stray capacitance of the coil 24 and also of the electrode 28 may be equivalently expressed by a condenser 29 connected across the series combination of the coil 24 and the condenser 22. Between a pair of lines 33 and 35 leading from a pair of source terminals 32 and 34, respectively, there is connected a condenser 36 to connect these lines at high frequencies and at the same time to function as a smoothing condenser. The condenser 36, however, is not required if the operating direct current source presents a low impedance to high frequencies. The electrode 28 is connected to the line 35 through a low voltage discharge tube 38.

Electromagnetically connected to the coil 14 there is a coupling coil 40 to take out the oscillating output of the oscillator from the coil 14. The oscillating output transmitted to the coil 40 is applied to an amplifier 44 comprising a transistor 42, the output of which is applied through a half-wave diode rectifier 46 to a switching circuit 50 comprising a transistor 48. The presence or absence of an output at the terminal 52 caused by the conducting or non-conducting condition of the transistor 48 is utilized to indicate the approach of an object to the detecting electrode. A Zener diode 53 is connected between the lines 33 and 35 to stabilize the operating voltage.

Figure 2:
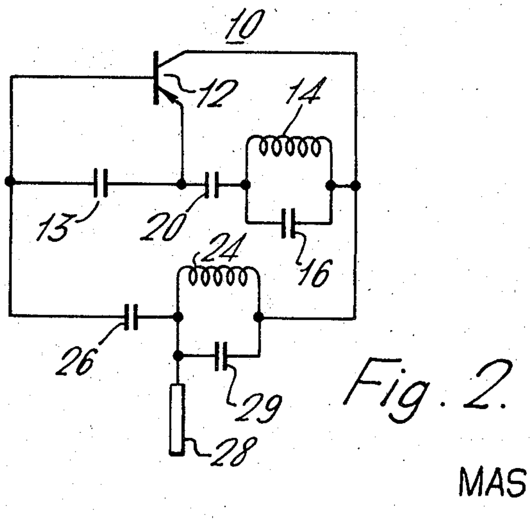
FIG. 2 is an equivalent circuit diagram of the oscillator as shown in FIG. 1.

Although the condenser 22 freely passes frequencies of the order of megacycles, it prevents the direct current voltage between the terminals 32 and 34 from being applied to the detecting electrode 28. The oscillator 10 can be drawn as an equivalent high-frequency circuit in FIG. 2.

As previously mentioned, in order for the oscillator 10 to be oscillating, it is necessary that both the base-emitter reactance X*be* of the transistor 12 and the emitter-collector reactance *Xec* thereof should be capacitive and that the base-collector reactance X*bc* of the transistor should be inductive. While the reactance X*be* is always capacitive regardless of the oscillating frequency, the reactance *Xec* has a series-resonant angular frequency $\omega_1$ and a parallel-resonant angular frequency $\omega_2$ and the reactance *Xbc* also has a series-resonant angular frequency $\omega_3$ and a parallel-resonant angular frequency $\omega_4$. Let it be assumed here that $\omega_1<\omega_2<\omega_3<\omega_4$. A series combination of the reactances X*be*, X*ec* and X*bc* will have four $\omega_5$, $\omega_6$, $\omega_7$ and $\omega_8$, and the oscillating angular frequency $\omega_0$ of the oscillator 10 will be equal to the series-resonant frequency $\omega_5$ or $\omega_7$; and the parallel-resonant frequency $\omega_2$ of the reactance Xec, and the parallel-resonant frequency $\omega_4$ of the reactance *Xbc*, to the parallel-resonant frequencies $\omega_6$ and $\omega_8$, respectively.

Figure 3:
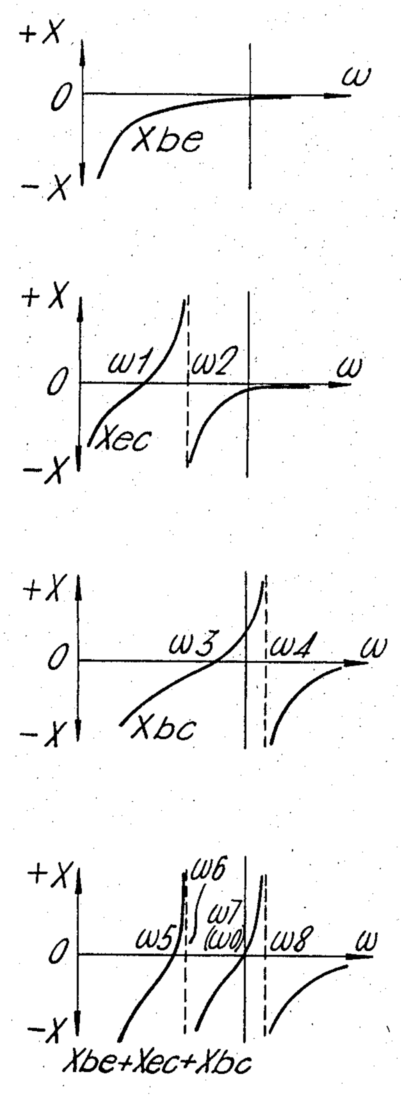
FIGS. 3 and 4 show graphs of frequency characteristic curves of reactances used in the oscillator.

The above relations will be better illustrated in the graphs of FIG. 3. Near $\omega_5$ the reactance *Xec* is inductive while the reactance X*bc* is capacitive, so that the oscillator cannot start oscillations. However, near $\omega_7$ the reactance X*bc* is inductive and the reactance X*ec*, capacitive, so that the oscillator starts oscillations, with $\omega_0$ having become equal to $\omega_7$.

Suppose that the detecting electrode 28 is disposed within a tank which is grounded and into which material to be detected such as, for example, grains or powder is to be stored. Because the line 35 is grounded as shown and because the lines 33 and 35 are at the same potential at high frequencies, the capacitance of the electrode 28 due to the presence of the powder is connected across the series combination of the condenser 22 and coil 24 and consequently across the condenser 29.

Figure 4:
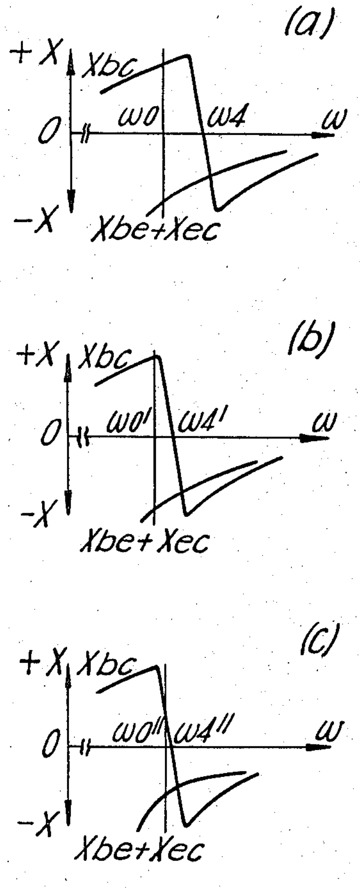

The resonant frequencies $\omega_1$ through $\omega_4$ of the reactances X*ec* and X*bc* of the oscillator 10 and the oscillating frequency $\omega_0$ thereof can be set to desired values by selecting the circuit constants determining the reactances. Then, with $\omega_0$ and $\omega_4$ having been set very close to each other, that portion of the reactance curve of the reactance X*bc* which is close to $\omega_0$ and $\omega_4$ is plotted microscopically as shown in FIG. 4*a*, with due consideration given to the various losses due to the coils, resistances, etc.

As the level of the powder approaches the electrode 28, the capacitance across the coil 24 increases, so that the values $\omega_3$ and $\omega_4$ and consequently $\omega_0$ decrease. The greater is the increase in the capacitance, the greater is the decrease in those values.

As the oscillating frequency $\omega_0$ decreases, the capacitive reactance component of X*ec* at $\omega_0$ becomes smaller. This in turn cause $\omega_0$ to increase. These two opposite tendencies, however, will finally be balanced, whereupon $\omega_0$ and $\omega_4$ become $\omega_0'$ and $\omega_4'$, respectively, and the frequency characteristic curve has been shifted as shown in FIG. 4*b*. Theoretically, this shifted condition is that of parallel resonance and the oscillation would have already stopped before the parallel resonance was accomplished. In practical circuits, however, the Q of resonant circuits cannot be very high. Therefore, upon further increase in the capacitance across the coil 24 caused by the level of the powder coming closer to the electrode, $\omega_4'$ and $\omega_0'$ will be further shifted to values $\omega_4''$ and $\omega_0''$, respectively, as shown in FIG. 4*c*. Then, the decrease in $\omega_4$ renders the inductive reactance component of X*bc* lower, thereby causing $\omega_0$ to become higher, until the reactance is changed from being inductive to capacitive, and a moment before this change the oscillation stops. Since the change of the reactance X*bc* is effected near its parallel-resonant frequency, a small change in the oscillating frequency causes the oscillating condition to greatly change for the oscillation to stop with a snap action.

When the level of the powder under detection moves away from the electrode 28, the oscillating frequency $\omega_0$ will be restored to the original value so that oscillation will be started again.

The operating sensitivity of the apparatus may be changed by changing the balancing point between the decrease in the oscillating frequency $\omega_0$ due to the approach of an object to be detected to the electrode 28 and the increase in $\omega_0$ due to the characteristic of the reactance X*ec*. In other words, the sensitivity can be changed by changing the capacitance of the variable condenser 16.

In case of the object to be detected is already electrostatically charged, it is required that the charge on the electrode be not discharged through the transistor 12. To this end, the discharge tube 38 is provided for the charge to be discharged therethrough into ground.

The oscillating output of the oscillator 10 appears as a terminal voltage across the coil 40. This voltage is amplified through the amplifier 44 and rectified by the half-wave rectifier 46 and then applied to the base of the transistor 48 of the switching circuit 50, whereupon the transistor 48 is rendered non-conductive so that a voltage appears across the terminals 52 and 34. Under the condition, when the oscillator stops its oscillation, the transistor 48 becomes conducting so that the voltage across the terminals 52 and 34 decreases. By this decrease the stoppage of the oscillation and consequently the approach of an object to the electrode can be known.

The oscillating amplitude of the oscillator 10 tends to decrease as the capacitance of the electrode 28 increases. If the arrangement is such that when the capacitance increases to a predetermined value, the oscillating amplitude of the oscillator has a sudden drop, the oscillation of the oscillator will stop with a snap action. To improve this, a series combination of a semi-conductor diode 60 and a resistor 62 is connected across the coupling coil 40.

In the above embodiment, transistors are employed as circuit elements, but may be replaced by vacuum tubes. Generally speaking, various difficulties are encountered when a system of a vacuum-tube type is transistorized, but conversion of a transistorized type into a corresponding vacuum-tube pauses not so difficult problems.

What I claim is:

1. Proximity detecting apparatus comprising: an oscillator including a transistor having collector, base and emitter elements, a reactance circuit connected between the collector and base of said transistor, said reactance circuit having a parallel-resonant frequency and a series-resonant frequency and being of such characteristic that when said reactance circuit is inductive, the oscillator oscillates, while the oscillation stops when said reactance circuit becomes capacitive, a first capacitive reactance circuit connected between the emitter and base of said transistor, and a second capacitance reactance circuit having a parallel combination of an inductance coil and a condenser, and a condenser connected in series with said parallel combination, said second capacitive reactance circuit being connected between the collector and emitter of said transistors; a detecting electrode the change of whose capacitance upon approach of an object thereto causes said reactance circuit to change from being inductive to capacitive; and means operable in response to the oscillating output of said oscillator for indicating the approach of an object to said electrode.

2. The apparatus defined in claim 1, further including a coupling coil electromagnetically connected to the inductance coil of said second reactance circuit, the voltage induced in said coupling coil being applied to said indicating means to operate same.

3. The apparatus defined in claim 2, further including a non-linear diode connected across said coupling coil, the voltage induced in said coupling coil being applied to said indicating means to operate same.

4. The apparatus as defined in claim 1, further including a low voltage discharge tube connected between said electrode and ground.

References Cited

UNITED STATES PATENTS

| | | | |
|---|---|---|---|
| 2,919,413 | 12/1959 | Charles | 331—65 |
| 2,958,829 | 11/1960 | Hay | 331—65 |
| 3,032,722 | 5/1962 | Banasiewicz. | |
| 3,067,364 | 12/1962 | Rosso. | |
| 3,256,496 | 6/1966 | Angel | 331—117 X |

JOHN W. CALDWELL, *Primary Examiner.*
D. L. TRAFTON, *Assistant Examiner.*

U.S. Cl. X.R.

331—65, 117